United States Patent
Baharav et al.

(10) Patent No.: US 6,751,352 B1
(45) Date of Patent: Jun. 15, 2004

(54) METHOD AND APPARATUS FOR GENERATING AND DECODING A VISUALLY SIGNIFICANT BARCODE

(75) Inventors: Izhak Baharav, Palo Alto, CA (US); Cormac Herley, Los Gatos, CA (US); Yihong Xu, Marlborough, MA (US); Jonathan Yen, San Jose, CA (US); Timothy Harrison, Belmont, CA (US); Doron Shaked, Haifa (IL); Avraham Levy, Kiryat-Tivon (IL); Angela K. Hanson, Eagle, ID (US); Terry P. Mahoney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/579,070

(22) Filed: May 25, 2000

(51) Int. Cl.[7] .................................................. G06K 9/00
(52) U.S. Cl. ..................... 382/183; 382/233; 382/306; 235/462.01
(58) Field of Search ................................ 382/181, 183, 382/232, 233, 306, 100, 112, 173, 203, 225; 235/462.01, 462.09, 462.1

(56) References Cited

U.S. PATENT DOCUMENTS

| | | | |
|---|---|---|---|
| 4,637,051 A | 1/1987 | Clark | 382/101 |
| 4,777,357 A | 10/1988 | Harada | 235/462.27 |
| 4,822,986 A | 4/1989 | Guthmueller et al. | 235/462.02 |
| 4,901,073 A | 2/1990 | Kibrick | 341/13 |
| 4,924,078 A | 5/1990 | Sant'Anselmo et al. | 235/494 |
| 5,060,980 A | 10/1991 | Johnson et al. | 283/70 |
| 5,075,862 A | 12/1991 | Doebert et al. | 358/1.18 |
| 5,091,966 A | 2/1992 | Bloomberg et al. | 382/203 |
| 5,120,940 A | 6/1992 | Willsie | 235/462.08 |
| 5,195,123 A | * 3/1993 | Clement | 378/166 |
| 5,315,098 A | 5/1994 | Tow | 235/494 |
| 5,337,361 A | 8/1994 | Wang | 380/51 |
| 5,339,170 A | 8/1994 | Fan | 358/3.08 |
| 5,459,307 A | 10/1995 | Klotz, Jr. | 235/454 |
| 5,486,686 A | 1/1996 | Zdybel, Jr. et al. | 235/375 |

(List continued on next page.)

FOREIGN PATENT DOCUMENTS

WO     WO 00 11599 A     3/2000

OTHER PUBLICATIONS

Zhigang Fan, "Dot–to–dot error diffusion," Journal of Electronic Imaging, vol. 2(1) (Jan. 1993).

N. Damera–Venkata and B. L. Evans, "FM Halftoning Via Block Error Diffusion," Proc. IEEE International Conference on Image Processing, Oct. 7–10, 2001, vol. II, pp. 1081–1084, Thessaloniki, Greece.

Antognini et al., "A Flexibly Configurable 2D Bar Code," pp. 1–36 (Before May 25, 2000) (http://www.paperdisk.com/ibippa–pr.htm).

*Primary Examiner*—Daniel Mariam

(57) ABSTRACT

A barcode system for generating and decoding a barcode with visual significance. The barcode system of the present invention includes an encoding module for receiving a message and a logo and generating a visually significant barcode based on these inputs. A decoding module is also provided for receiving an acquired version of a visually significant barcode that may have been degraded in a typical document handling channel (e.g., through the printing, scanning, or copying process) and for recovering the message specified by the visually significant barcode.

27 Claims, 7 Drawing Sheets

U.S. PATENT DOCUMENTS

| | | | |
|---|---|---|---|
| 5,513,563 A | 5/1996 | Berson | 101/91 |
| 5,523,552 A | 6/1996 | Shellhammer et al. | 235/462.09 |
| 5,527,407 A * | 6/1996 | Gartland et al. | 156/64 |
| 5,541,396 A | 7/1996 | Rentsch | 235/454 |
| 5,550,365 A | 8/1996 | Klancnik et al. | 235/462.25 |
| 5,591,956 A | 1/1997 | Longacre, Jr. | 235/462.1 |
| 5,644,408 A * | 7/1997 | Li et al. | 358/468 |
| 5,661,284 A | 8/1997 | Freeman | 235/380 |
| 5,682,030 A | 10/1997 | Kubon | 235/462.25 |
| 5,706,099 A | 1/1998 | Curry | 358/3.28 |
| 5,710,814 A | 1/1998 | Klemba et al. | 713/173 |
| 5,778,076 A | 7/1998 | Kara et al. | 380/51 |
| 5,790,703 A | 8/1998 | Wang | 358/3.28 |
| 5,799,112 A | 8/1998 | de Queiroz et al. | 382/254 |
| 5,801,944 A | 9/1998 | Kara | 705/401 |
| 5,818,970 A | 10/1998 | Ishikawa et al. | 382/248 |
| 5,819,240 A | 10/1998 | Kara | 705/408 |
| 5,835,615 A | 11/1998 | Lubow et al. | 382/112 |
| 5,866,895 A | 2/1999 | Fukuda et al. | 235/494 |
| 5,871,288 A | 2/1999 | Ryan et al. | 400/103 |
| 5,880,451 A | 3/1999 | Smith et al. | 235/462.1 |
| 5,897,669 A | 4/1999 | Matsui | 235/462.07 |
| 5,898,166 A | 4/1999 | Fukuda et al. | 235/494 |
| 5,912,745 A | 6/1999 | Ulichney | 358/3.13 |
| 5,946,415 A | 8/1999 | Su et al. | 382/190 |
| 5,953,426 A | 9/1999 | Windel et al. | 380/51 |
| 5,974,147 A | 10/1999 | Cordery et al. | 705/62 |
| 5,974,200 A | 10/1999 | Zhou et al. | 166/281 |
| 5,982,896 A | 11/1999 | Cordery et al. | 705/62 |
| 5,996,893 A | 12/1999 | Soscia | 235/462.1 |
| 6,032,861 A | 3/2000 | Lemelson et al. | 235/456 |
| 6,064,738 A | 5/2000 | Fridrich | 380/28 |
| 6,064,764 A | 5/2000 | Bhaskaran et al. | 382/183 |
| 6,116,510 A | 9/2000 | Nishino | 235/494 |
| 6,141,441 A | 10/2000 | Cass et al. | 382/166 |
| 6,141,450 A | 10/2000 | Chen et al. | 382/237 |
| 6,151,590 A | 11/2000 | Cordery et al. | 705/60 |
| 6,172,773 B1 | 1/2001 | Ulichney | 358/3.13 |
| 6,175,827 B1 | 1/2001 | Cordery et al. | 705/410 |
| 6,193,158 B1 | 2/2001 | Hecht et al. | 235/462.16 |
| 6,201,901 B1 | 3/2001 | Zhou et al. | 382/306 |
| 6,212,504 B1 | 4/2001 | Hayosh | 705/64 |
| 6,240,196 B1 | 5/2001 | Fischer et al. | 382/100 |
| 6,240,212 B1 | 5/2001 | Son et al. | 382/243 |
| 6,252,675 B1 | 6/2001 | Jacobs | 358/1.9 |
| 6,256,398 B1 | 7/2001 | Chang | 382/100 |
| 6,263,086 B1 | 7/2001 | Wang | 382/100 |
| 6,311,214 B1 | 10/2001 | Rhoads | 709/217 |
| 6,364,209 B1 | 4/2002 | Tatsuta et al. | 235/494 |
| 6,373,587 B1 | 4/2002 | Sansone | 358/1.15 |
| 6,398,117 B1 | 6/2002 | Oakeson et al. | 235/494 |
| 6,427,021 B1 | 7/2002 | Fischer et al. | 382/101 |
| 6,430,302 B2 | 8/2002 | Rhoads | 382/100 |
| 6,457,651 B2 | 10/2002 | Paul et al. | 235/494 |
| 6,470,096 B2 | 10/2002 | Davies et al. | 382/203 |
| 6,493,110 B1 | 12/2002 | Roberts | 358/1.2 |
| 6,510,997 B1 * | 1/2003 | Wilz et al. | 235/472.01 |
| 6,526,155 B1 | 2/2003 | Wang | 382/100 |
| 6,611,623 B2 * | 8/2003 | Konishi et al. | 382/181 |
| 2001/0047476 A1 | 11/2001 | Yen et al. | 713/168 |

* cited by examiner

METHOD AND APPARATUS FOR GENERATING AND DECODING A VISUALLY SIGNIFICANT BARCODE

FIELD OF THE INVENTION

The present invention relates generally to bar codes and more specifically to a method and apparatus for generating and decoding a visually significant barcode.

BACKGROUND OF THE INVENTION

Barcodes are information carrying graphical patterns designed for easy and reliable automatic retrieval. The most common barcodes are known as one-dimensional barcodes. These graphical patterns vary in a single dimension (e.g. the horizontal dimension), and are constant in the other dimension (e.g., the vertical dimension). One-dimensional barcodes are employed in low information content applications like product index registry (e.g. automatic price tagging and inventory management), or serial number registry (e.g. test-tube tagging in automated medical tests). Common examples of one-dimensional barcodes are those barcodes that are affixed or printed on the packages of items purchased at a supermarket or department store. These barcodes typically can only encode limited information, such as the price of the item and the manufacturer. The items having the barcodes are scanned at a checkout counter to facilitate the tallying up of a total receipt.

In order to convey more information on the same surface area, two-dimensional barcodes were developed. Two-dimensional barcodes involve intricate patterns that vary in both the horizontal and the vertical dimensions. Two-dimensional barcodes are used in applications that require more information contents. For example, two-dimensional barcodes can be used to encode mail addresses for automated mail reading and distribution systems. Mail carrier companies can use the two-dimensional bar code on shipping packages to encode shipper information, recipient information, tracking information, etc. In another example, two-dimensional barcodes can be used to encode the compressed content of a printed page to avoid the need for optical character recognition at the receiving end.

U.S. Pat. Nos. 5,060,980, 5,486,686, and 5,459,307 illustrate an exemplary 2D barcode system. This system utilizes short black bars that have a forward orientation or a backward orientation (e.g., bars that are oriented at either 45% or 135% with respect to a reference) to render the barcode. The two possible orientations of the bar allow information (e.g., 1 or 0) to be encoded therein. This system offers a limited improvement over the traditional 2D barcode in that the appearance of these short black bars while still distracting to the human visual system is less so than the traditional 2D barcode. Consequently, it is asserted by these patents that a barcode utilizing these bars can be placed in the background of a document without excessively distracting a person reading such a document.

Unfortunately, the unsightly appearance of 2D bar codes relegates these bar codes to impersonal commercial and industrial setting regardless of whether the barcode less distracting and can be incorporated into the background of a document. For example, in many consumer applications, the current visually meaningless barcode patterns are prohibitive, since users are more likely to decline the benefits of the application rather than to include a "barcode" on their letterhead.

Another challenge in the design and use of 2D barcodes is the ability to produce barcodes by using office equipment (e.g., printers) that can be subsequently read back also using office equipment (e.g., scanners). For example, the 2D system must address printer and scanner distortions that can vary across different types and manufacturers of the office equipment. It is desirable that the 2D barcode be reliably generated and scanned regardless of the type of machine and the manufacturer of the machine. It is also desirable that the barcode be robust to photocopying (i.e., the barcode can be scanned and information embedded therein decoded from a copy of the originally rendered barcode).

Accordingly, there remains a need for a visually significant 2D bar code that is robust to distortions in the paper path and that overcomes the disadvantages set forth previously.

SUMMARY OF THE INVENTION

It is an object of the present invention to provide a method of generating and decoding a barcode with visual significance.

It is a further object of the present invention to provide a barcode pattern with visual significance that is robust to consecutive photocopying and common office document degradation.

It is a further object of the present invention to provide a barcode pattern with visual significance that can be printed and read by standard office equipment.

The barcode system of the present invention includes an encoding module for receiving a message and a logo and generating a visually significant barcode based on these inputs. A decoding module is also provided for receiving an acquired version of a visually significant barcode that may have been degraded in a typical document handling channel (e.g., through the printing, scanning, or copying process) and for recovering the message specified by the visually significant barcode.

DETAILED DESCRIPTION

Figure 1:
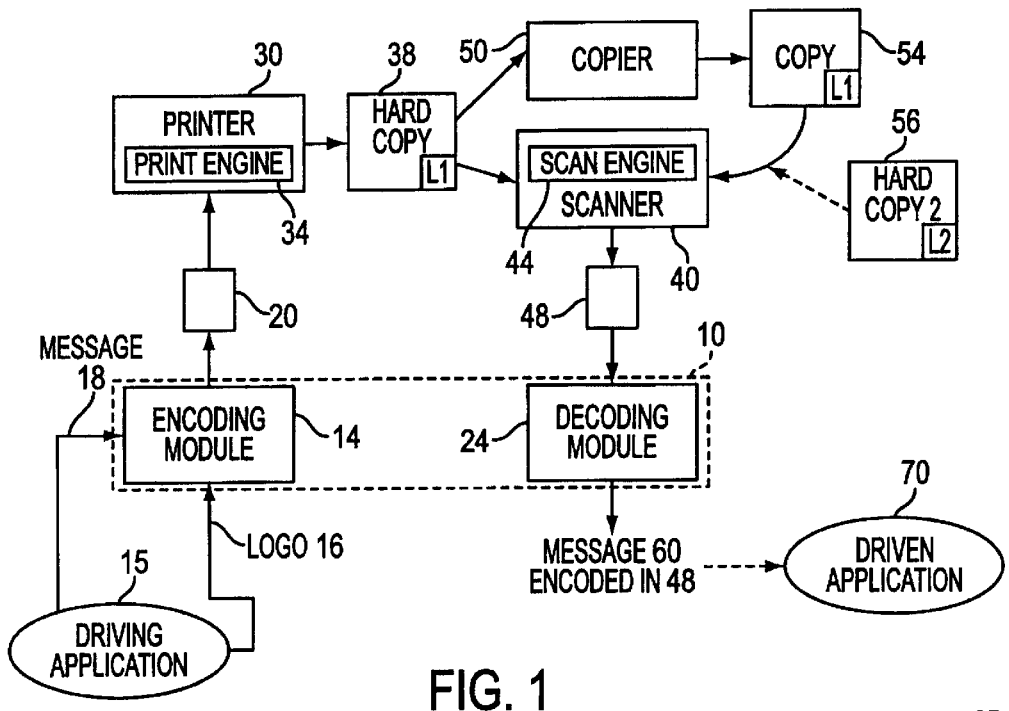
FIG. 1 is a block diagram illustrating an office environment in which one embodiment of the visually significant bar code system of the present invention that does not accept user input can be implemented.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well-known or conventional details are not described in order not to unnecessarily obscure the present invention in detail. In the drawings, the same element is labeled with the same reference numeral.

Visually Significant Bar Code System 10

FIG. 1 is a block diagram illustrating an office environment in which one embodiment of the visually significant bar code system (VSBCS) 10 of the present invention that does not accept user input can be implemented. The visually significant bar code system (VSBCS) 10 includes an encoding module 14 for generating a visually significant bar code (VSBC) 20 by utilizing a rendering technique and a decoding module 24 for decoding an acquired version 48 of a hard copy (e.g., a first hard copy 38, a copy 54 of the first hard copy 38, or a second hard copy 56) that includes a visually significant bar code (VSBC) and for recovering a message 60 that is specified in the acquired version 48. The VSBC 20 can be rendered by utilizing rendering techniques that are well-known to those of ordinary skill in the art. In one embodiment, the VSBC 20 is rendered by utilizing a halftone algorithm to generate a halftoned VSBC 20.

The system 10 can communicate with a driving program 15 for providing the logo 16 and the message 18 and also communicate with a driven program 70 for utilizing the recovered message 48 for a particular application.

The encoding module 14 includes a first input for receiving a logo 16, a second input for receiving a message 18, and an output for generating the visually significant bar code (VSBC) 20. The message 18 can be any information that a system designer specifies.

Logo 16 can be any graphical pattern that has visual significance, which is in sharp contrast to prior 2D bar codes that do not make sense as graphical entities. For example, logo 16 can include, but is not limited to, an actual logo, graphics, a picture, text, a text box, an image, or any other pattern that has visual significance. Exemplary logos can include a company logo, an application logo, or action logo. Exemplary graphics can be frames, button marks, or background. An example of text is a text box having the words "This box contains important data!" The VSBC can be a bar code pattern that is embedded in the graphical design of text, pictures, images, borders, or the background of a document.

The VSBC pattern may be, but is not limited to, a binary image (e.g., a black and white dot pattern), a multi-level image (e.g., a gray-level image), or a multilevel color image that is generated by encoding module 14. The encoding module 14 is described in greater detail hereinafter with reference to FIG. 5.

The office environment typically includes office equipment, such as a personal computer (PC) (not shown), a printer 30 having a print engine 34, a scanner 40 having a scan engine 44, a facsimile machine (not shown), and a copier 50 for making copies of documents (e.g., copy 54). The print engine 34 receives images (e.g., halftoned images) from sources, such as the encode module 14, and renders these images to create hard copies, such as hard copy 38 with a first VSBC (L1). The scan engine 44 receives a hard copy (e.g., a hard copy 38 or 54 with a first VSBC (L1) or a second hard copy 56 with a second VSBC (L2)), generates an acquired version 48 (e.g. a scanned version) of the received hard copy, and provides the acquired version 48 to applications, such as decoding module 24. It is noted that the scanner 40 can be replaced with a digital camera for acquiring a version of the visually significant barcode. Furthermore, the scan engine 44 can be any acquisition engine for capturing the VSBC and providing an acquired version (e.g., a digital representation) of the VSBC. The operation and construction of these office machines and their respective components are generally well known by those of ordinary skill in the art and are not described herein.

In a typical document-handling path, the VSBC along with the remainder of the document is provided to a printer, such as printer 30. The printer 30 then utilizes the print engine 34 to render a first hard copy 38 that includes a first VSBC (L1). The hard copy 38 may then be provided directly to a scanner, such as scanner 44, to generate a scanned version 48. Alternatively, the hard copy 38 can first be copied once or several times utilizing a copier, such as the copier 50. Thereafter, the copied version (e.g., copy 54) can be provided to the scanner 44 to generate the scanned version 48. It is noted that a second hard copy (e.g., hard copy 56) can be generated (e.g., printed or copied) by utilizing a printer (not shown) different from printer 30 that is part of a separate office. Also, it is noted that the logo 16 can vary from application to application (e.g., first VSBC (L1) or second VSBC (L2)) and can be specified by a system designer The decoding module 24 receives the acquired version 48 and recovers the message 60 encoded in the acquired version 48. For example, if the acquired version corresponds to the first hard copy 38 or to the copy 54, then the message in the first VSBC (L1) is recovered as the message 60. Alternatively, if the acquired version corresponds to the second hard copy 56 or photocopies thereof, then the message in the second VSBC (L2) is recovered as the message 60. The message 60 is then provided to a driven application 70 that performs one or more pre-determined functions or tasks, examples of which are described in greater detail hereinafter with reference to FIG. 3.

Figure 2:
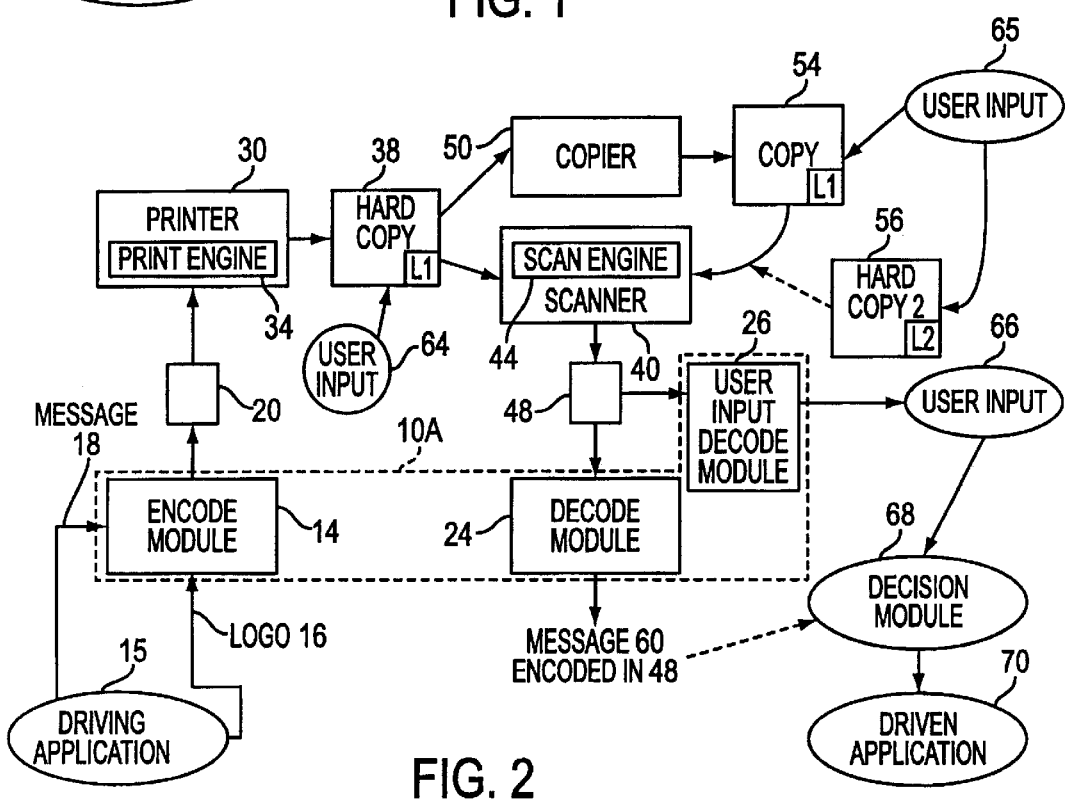
FIG. 2 is a block diagram illustrating an office environment in which an alternative embodiment of the visually significant bar code system of the present invention that accepts user input can be implemented.

FIG. 2 is a block diagram illustrating an office environment in which an alternative embodiment of the visually significant bar code system 10A of the present invention that accepts user input can be implemented. This visually significant bar code system 10B is similar to the system 10A illustrated in FIG. 1, except that this system 10A is configured to accept user input. A user can input information to the first hard copy 38, the copy 54, or the second hard copy 56 in the form of marks made by using a writing utensil (e.g., a pencil or pen) as will be explained in greater detail hereinafter with reference to FIG. 3. The system 10A includes a user input decoding module 26 for decoding the user input, such as (1) user input 64 that may be provided to the hard copy 38; or (2) user input 65 that may be provided to the copy 54 or the second hard copy 56. It is noted that the user input decoding module 26 may be integrated with the decoding module 24 or be separate from the decoding module 24 as shown.

In this embodiment, the decoded user input 66 and the message 60 specified by the acquired image 48 are provided to a decision module 68 that generates one or more signals based on the user input 66 and the message 60. These signals can specify or select from one of several options provided by the message. These signals are then provided to one or more driven programs or applications 70 that perform predetermined tasks or functions, launch other applications, or control other applications to perform the determined tasks. Examples of such task are described hereinafter with reference to FIG. 3.

It is noted that the driving application 15 and the driven application 70 can be the same application or different applications. Furthermore, the driving application 15 and the driven application 70 can be incorporated into the visually significant bar code system (VSBCS) 10 or be separate from the VSBC system 10.

Figure 3:
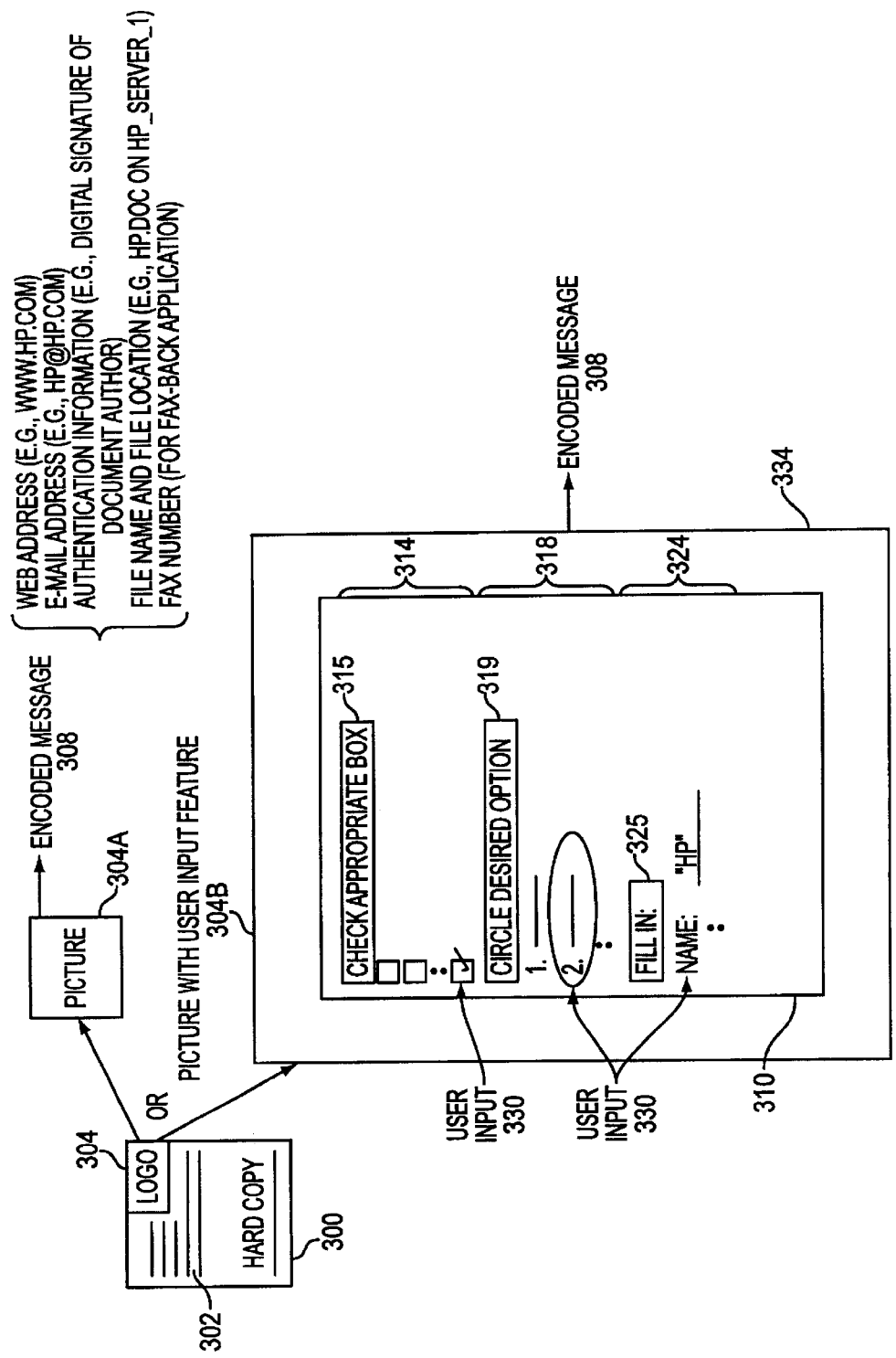
FIG. 3 illustrates a logo of a picture without any user input feature and a logo of a picture having a user input feature.

FIG. 3 illustrates a logo 304 of a picture 304A without any user input feature and a logo 304B of a picture having a user input feature. A document 300 (e.g., documents 38, 54, or 56) includes a non-logo portion 302 (e.g., text, images, pictures etc.) and a logo portion 304 (e.g., first VSBC (L1) or second VSBC (L2)) that is can be a VSBC 20. It is noted that the VSBC 20 is provided along with the non-logo portion so that a printer (e.g., the printer 30) can render the entire document 300. Since the rendering and decoding non-logo portions of documents are well known by those of ordinary skill in the art, these operations are not described herein.

The logo 304 can be a picture 304A without any user input feature or a picture 304B with a user input feature. In either case, the picture (304A or 304B) includes an encoded message 308 that can be, but is not limited to, an Internet address (e.g., a World Wide Web address), an electronic mail address, authentication information (e.g., a digital signature or the author or sender of the document), a file name and file location, a facsimile number for "fax-back" applications, or a combination thereof.

One aspect of the present invention is providing a VSBC to increase the value of documents and to create "living documents". Living documents are those documents that have more information (e.g., encoded messages) than meets the eye or is apparent in viewing the documents. Living documents have encoded messages in the form of VSBCs that can be used to dynamically retrieve additional information (e.g., updated versions of the document), to reduce human intervention, to increase convenience, to improve efficiency in the office, to increase security in the distribution of documents, to increase productivity and to facilitate interaction and communication between people in the office.

There are numerous applications that use one or more of the types of messages, described above, and encodes these types of messages into documents. It is to be appreciated that there are many other types of messages or information that may be encoded into documents and numerous applications related thereto. The cornerstone of these applications is the VSBCS of the present invention.

For example, one application of the present invention is to use the VSBC to store the file name and the file location (e.g., path to access the document on a server, Web site, etc.). When a document having a VSBC that contains file and file location information is scanned into or otherwise acquired by a personal computer, a Most-Recent Document Application can utilize this information to access the most recent or updated electronic version of the document and launch the document by using a word processing application.

As can be appreciated, the present invention provides significant improvements over the prior art approach that would attempt to convert the scanned version into a text-editable version via some type of OCR. The OCR approach is prone to many errors and mistakes in recognition. In addition, regardless how accurate the OCR utilized, only the version as shown on the physical document can be accessed. If that document has been subsequently revised, there is no mechanism that would allow for the retrieval of the most up-to-date version. This application retrieves the most-current electronic version even if the document has poor quality text that is inadequate for recognition by prior art OCR methods because the file name and file path are encoded in the VSBC.

Similarly, the encoded name and location of the original electronic version of the document, allows a copier to utilize the original document to be utilized as a copy source instead of having to rely on the document in-hand with the VSBC, which may have been severely degraded in the typical paper handling path. This is an example of a Copy-from-Electronic-Version Application.

A security application can utilize authentication information encoded in the VSBC for authentication purposes or other secure communication functions. For example, a digital signature can be encoded into the VSBC so that the source of the document can be authenticated.

In another example, the facsimile number is encoded in the VSBC so that an Automatic Fax-Back Application can utilize the encoded facsimile number to automatically dial the number when the document is fed into a facsimile machine without user intervention. Alternatively, an e-mail address may be encoded in the VSBC so that an Automatic Electronic-Mail Response Application can utilize the encoded electronic mail address to automatically send more information (e.g., a response) via e-mail to the author of the document.

The picture 304B with a user input feature can include one or more user input forms. For example, a Check Box Form 314 can be provided for a user to select from one of several options by simply checking the appropriate box. The text message box "Check Appropriate Box" 315 can be a visually significant barcode. In another example, a Circle Selection Form 318 can be provided for a user to select from one of several options by simply circling the appropriate selection. The text message box "Circle Desired Option" 319 can be a visually significant barcode. In yet another example, a Fill-In Form 324 can be provided for a user to fill in information requested by the form. The text message box "Fill In" 325 can be a visually significant barcode.

Each of these forms request user input 330, such as a check mark, a circle, or text input. The user input 330 can then be decoded by the user input decode module 26 to recover the user input. Thereafter, the decision module 68 utilizes the user input in conjunction with the recovered message to select one of several available functions or tasks, and the driven application 70 for performing the selected tasks can be launched. For example, the user input can be utilized to arbitrate between different messages encoded in the different visually significant text boxes. In the automatic e-mail response application, the user input and the different visually significant text boxes can be utilized to (1) reply only to the sender or (2) to reply to all recipients including the sender.

The VSBC system 10 or 10A can be embodied on a media that is incorporated in office equipment (e.g., a personal computer (PC), printer, facsimile machine, scanner, copier, all-in-one machine, etc.) or separate from office equipment. When incorporated in office equipment, the media, having the VSBC system 10 or 10A embodied therein, can be in the form of a memory (e.g., random access memory (RAM), read only memory (ROM), etc.). When incorporated separate from the office equipment, the media, having VSBC system 10 or 10A embodied therein, can be in the form of a computer-readable medium, such as a floppy disk, compact disc (CD), etc.

Figure 4A:
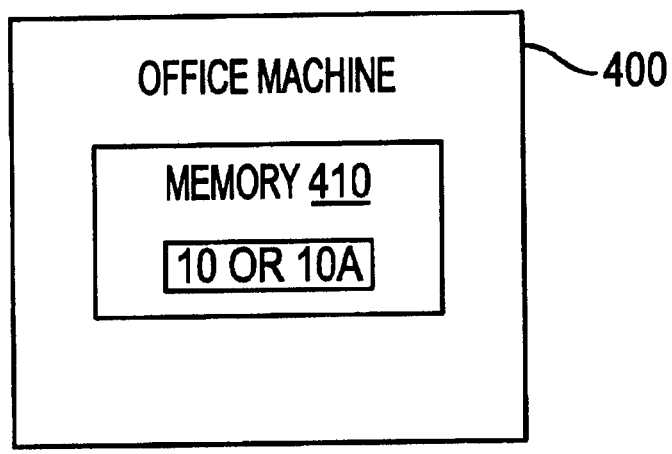
FIG. 4A is a block diagram illustrating an office machine in which the visually significant bar code systems of FIG. 1 or FIG. 2 can be implemented.

FIG. 4A is a block diagram illustrating an office machine 400 in which the VSBC system 10 or 10A can be implemented. The office machine 400 includes a memory 410 in which the VSBCS 10 or 10A of the present invention can reside. The office machine 400 may be a personal computer (PC). If this is the case, the PC can be coupled to a printer, scanner, an all-in-one machine or other peripheral machine. It is noted that the VSBCS 10 or 10A may reside in the PC in the form of a driver program associated with one of these peripheral machines or can be stored in a memory that is located in the peripheral machines.

Alternatively, the office machine can be an all-in-one office machine (e.g., an integrated scanner, printer, and facsimile machine) or any rendering machine.

Figure 4B:
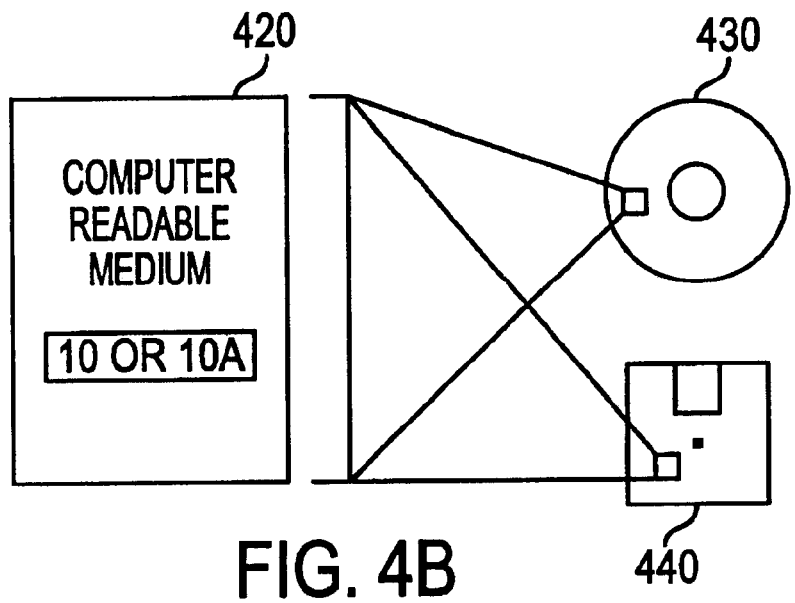
FIG. 4B is a block diagram illustrating a computer-readable medium in which the visually significant bar code systems of FIG. 1 or FIG. 2 can be implemented.

FIG. 4B is a block diagram illustrating a computer-readable medium 420 in which the VSBC system 10 or 10A of the present invention can be implemented. The computer-readable medium 420 may be a floppy disk 440, a compact disc (CD) 430, or other computer-readable medium, etc. As can be appreciated, the VSBC system 10 or 10A can be implemented in a variety of other ways and in a variety of other components that are commonly found in an office environment.

Figure 5:
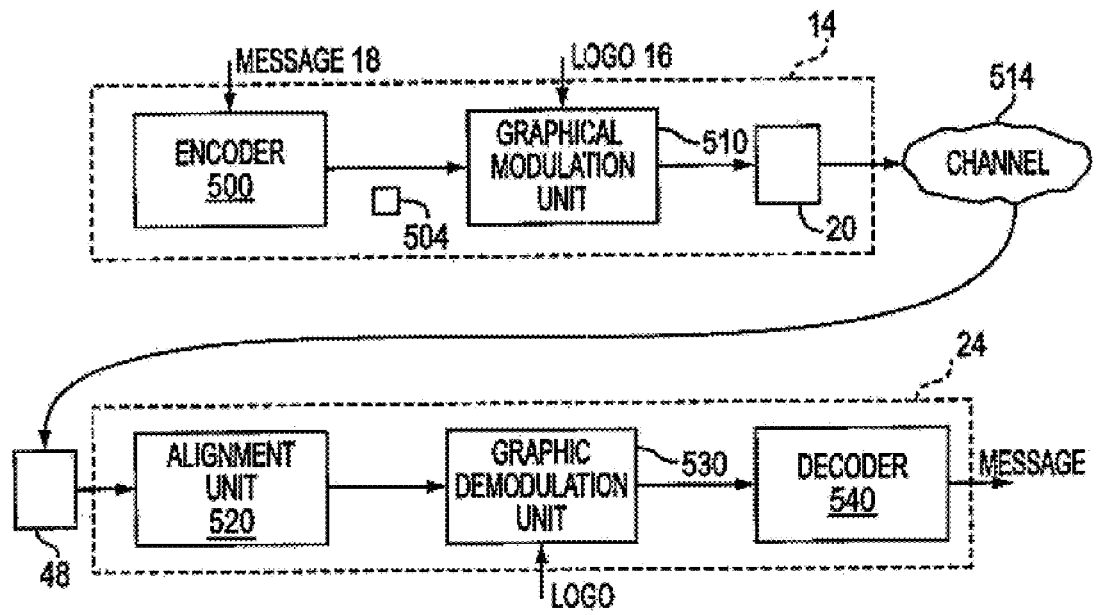
FIG. 5 is a block diagram illustrating in greater detail the encoding modules and the decoding modules of FIG. 1 or FIG. 2.

FIG. 5 is a block diagram illustrating in greater detail the encoding module 14 and the decoding module 24 of FIG. 1 and FIG. 2. The encoding module 14 includes an encoder 500 for receiving a message 18 and generating an encoded message 504 based on the message 18. Encoding module 14 also includes a graphic modulation unit 510 for receiving the logo 16 and the encoded message 504 and based thereon, generates the VSBC 20. The VSBC 20 can be a specific pattern. In the channel 514, the VSBC 20 can be rendered directly on a document or incorporated into a document and rendered thereon.

Preferably, the visually significant two-dimensional bar codes of the present invention are graphical patterns composed, usually though not necessarily, of dots. The visually significant bar codes of the present invention are rendered, usually though not necessarily, using two-toned dots (e.g. black dots on a white background), and occupy, usually though not necessarily, a rectangular area. The visually significant bar codes can incorporate various registration and fiducial marks, which are generally well known to those of ordinary skill in the art, for enabling automated identification and accurate registration of the bar code, which may be read in arbitrary orientations. In addition, the visually significant bar code system of the present invention can employ various error correcting codes, which are generally well known to those of ordinary skill in the art, for reliable automated retrieval of the bar codes.

The steps carried out by encoding module 14 to process the message 18 and the logo 16 to generate the VSBC 20 are described in greater detail hereinafter with reference to FIG. 6.

Channel 514 represents a typical office document-handling path for hard copies by standard office equipment. For example, a hard copy can be printed, photocopied, and scanned. It is understood that one or more of these standard office handling steps can be carried out by multi-functional equipment. Since the barcode pattern is subject to noise and office document degradation (e.g., folds, stains, marks, and staples) in the channel 514, a standard cleaning process to address the noise and degradation of barcode pattern can be employed.

The steps carried out by the decoding module 24 to recover the message 60 from the acquired image 48 are described in greater detail hereinafter with reference to FIG. 8.

Generating the VSBC 20

Figure 6:
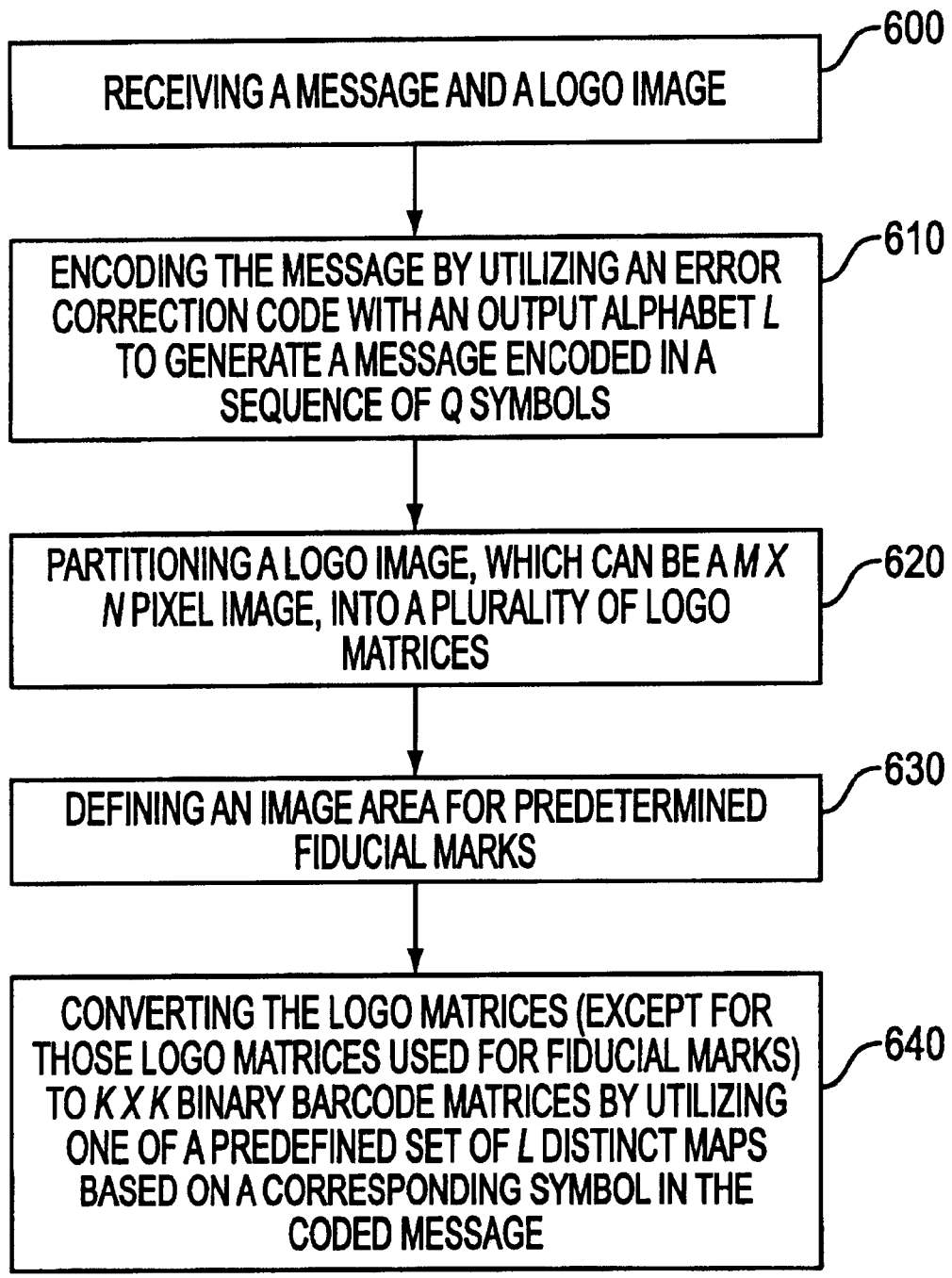
FIG. 6 illustrates a method of encoding a message into a visually significant barcode according to one embodiment of the present invention.

FIG. 6 illustrates a method of encoding a message 18 into a visually significant barcode 20 according to one embodiment of the present invention. In step 600, the message 18 and the logo 16 are received. The message 18 can also be compressed by utilizing well known compression techniques in this step. For certain applications, such as universal resource locators (URLs), a tailored or customized compression scheme may be preferable.

In step 610, the compressed message is encoded by utilizing an error correction code with an output alphabet L to generate a message encoded in a sequence of Q symbols. This encoding step provides robustness to errors in the channel 514. For example, a standard 16→31 bit BCH code that corrects for three errors, where L=4 (2 bits) can be used.

In step 620, the logo 16, which can be an M×N pixel image, is partitioned in a plurality of image matrices. In one example, K is equal to two (2), and M and N (i.e., the size of the logo 16) are even values (e.g., N=80 and M=40). The values of K, M and N can be modified and predetermined by a system designer to suit a particular application.

In step 630, an image area corresponding to R logo matrices is used for pre-defined fiducial marks. For example, the four corners of the image can be reserved for fiducial marks. In each corner, an area of 4×4 pixels (2×2 matrices) can be designated for fiducial marks. The fiducial marks can be the whole area rendered white, except for an isolated location in each corner that is set apart or separate from adjacent matrices, which is rendered black. The upper-left fiducial mark, for example, can be all white except for the upper-left pixel, which is rendered black. It is preferable that the pattern for the fiducial mark be as robust to channel noise as possible. Since dots may be blurred or move relative to each other due to noise in the channel 514, this pattern ensures that the black fiducial dots do not merge with neighboring dots, and instead stand out clearly on a white background. Various other fiducial patterns can be utilized depending on the particular types of noise in a particular channel of interest.

In step 640, the remaining logo matrices (i.e., P=M×N/(K×K)–R logo matrices) are converted to K×K binary barcode matrices by utilizing one of a predefined set of L distinct maps (e.g., halftoning algorithms) based on a corresponding symbol in the coded message. In one example, there are 784 remaining image-matrices (based on N=80 and M=40) that can be ordered in raster scan. The 784 image matrices can accommodate slightly more than 25 batches of 31 matrices (Q=25×31=775). It is important to note that P should be greater than Q. Each batch codes two batches of 16 input bits: (1) one batch for the BCH MS bits, and (2) the other batch for the BCH LS bits. Thus, for the parameters specified above, the barcode can encode 25×16×2=800 bits of information.

Figure 7A:
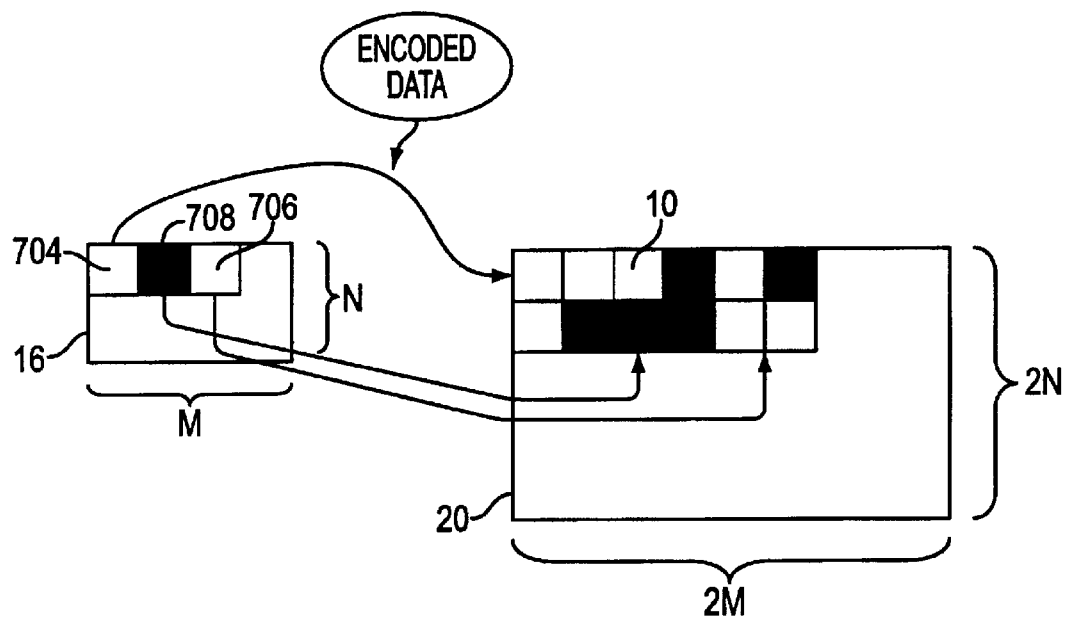
FIG. 7A illustrates an exemplary implementation of the encoding step of FIG. 6 in accordance with one embodiment of the present invention.

FIG. 7A illustrates an exemplary implementation of encoding step 640 of FIG. 6 in accordance with one embodiment of the present invention. The logo 16 includes a plurality of pixels having one of two different gray levels: 25% and 75%. For example, pixels 704, 706 have a 25% gray level, and pixel 708 has a 75% gray level.

Figure 7B:
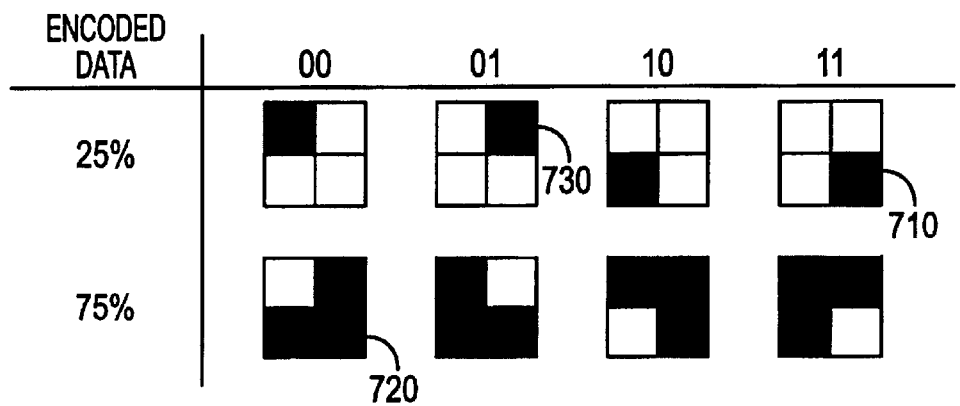
FIG. 7B illustrates pattern matrices according to one embodiment of the present invention that can be used in the encoding scheme of FIG. 7A.

Referring to FIG. 7B, for those pixels in the logo 16 that have a 25% gray level, one of the four bar code matrices in the first row is used to render the based on the data to be encoded. For example, if the data to be encoded is "11", pixel 704 is rendered by utilizing the bar code matrix 710. Similarly, if the data to be encoded is "01", pixel 706 is rendered by utilizing the bar code matrix 730. Similarly, for those pixels in the logo 16 that have a 75% gray level, one of the four bar code matrices in the second row is used to render the based on the data to be encoded. For example, if the data to be encoded is "00", pixel 708 is rendered by utilizing the bar code matrix 720.

Although this implementation utilizes two gray levels, 25% and 75%, it is noted that the present invention can be extended to include multiple levels can be utilized to suit a particular application. In addition, the present invention can be extended to pixels of different colors.

Alternatively, the remaining image-matrices can be ordered with interleaving methods that are known in the art, to provide robustness to burst-type degradations expected from stains, marks, or systematic printer/scanner distortions. The K×K binary barcode matrices can then be sent to a printer for printing onto a hard copy, such as a piece of paper.

There are many rendering methodologies from which one can choose the L distinct maps. For example, when halftoning algorithms are selected as the L distinct maps, there are many type of halftone methodologies one can choose from. In an exemplary implementation a fixed-halftone-pattern halftoning method is utilized. This method specifies that the image be a 2-tone image. If black is 0, and white is 1, the bright tone b, and the dark tone d, are such that d=1−b. Also, the L halftoning algorithms correspond to L distinct K×K pattern-matrices, where each pattern matrix contains b•K×K black dots on white background. However, it is noted that other well-known halftoning methods, such as cluster dithering, disperse dithering (e.g., blue noise), and error diffusion methods can be utilized. When an error diffusion algorithm is employed, one can select from many different methods to diffuse the error. Similarly, when a disperse dithering algorithm is utilized, one can select from many methods to define the dither matrices (also known as screens) of various sizes.

Given a logo-matrix, and the selected pattern-matrix, the resulting barcode-matrix contains the pattern matrix values in the places corresponding to the bright pixels in the logo-matrix, and their complementary otherwise.

In this embodiment, the dots are preferably rendered as square dots at 120 dots-per-inch (dpi). It is noted that larger dots are more robust to channel degradations, but smaller dots enable more information on the same area of the paper. The dots can be rendered at a dpi higher than 120 dpi as long as acceptable error resilience can be assured.

It is noted that the size of the dots can be varied according to intensity. An example of varying the size of dots based on intensity is to make the black dots slightly larger than the white dots. It is also noted that the size of the dots can be varied according to neighborhood. An example of varying the size of dots based on neighborhood is to make minority colored dots larger.

Figure 9:
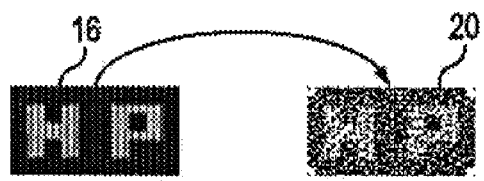
FIG. 9 illustrates an exemplary logo image and a corresponding visually significant barcode generated by the encoding method of the present invention.

FIG. 9 illustrates an exemplary logo 16 and message 18 that are used to generate a corresponding VSBC 20 by the encoding method of the present invention.

Decoding the Acquired Barcode Image 48

The image 48 acquired by the scanner 40 and introduced to the decoding module 24 is a degraded version of the original bar code-image. These degradations are attributed to the channel 514, namely, the printing and scanning processes, and potential office type degradations, such as copying, stains, folds, staples, and marks.

Figure 8:
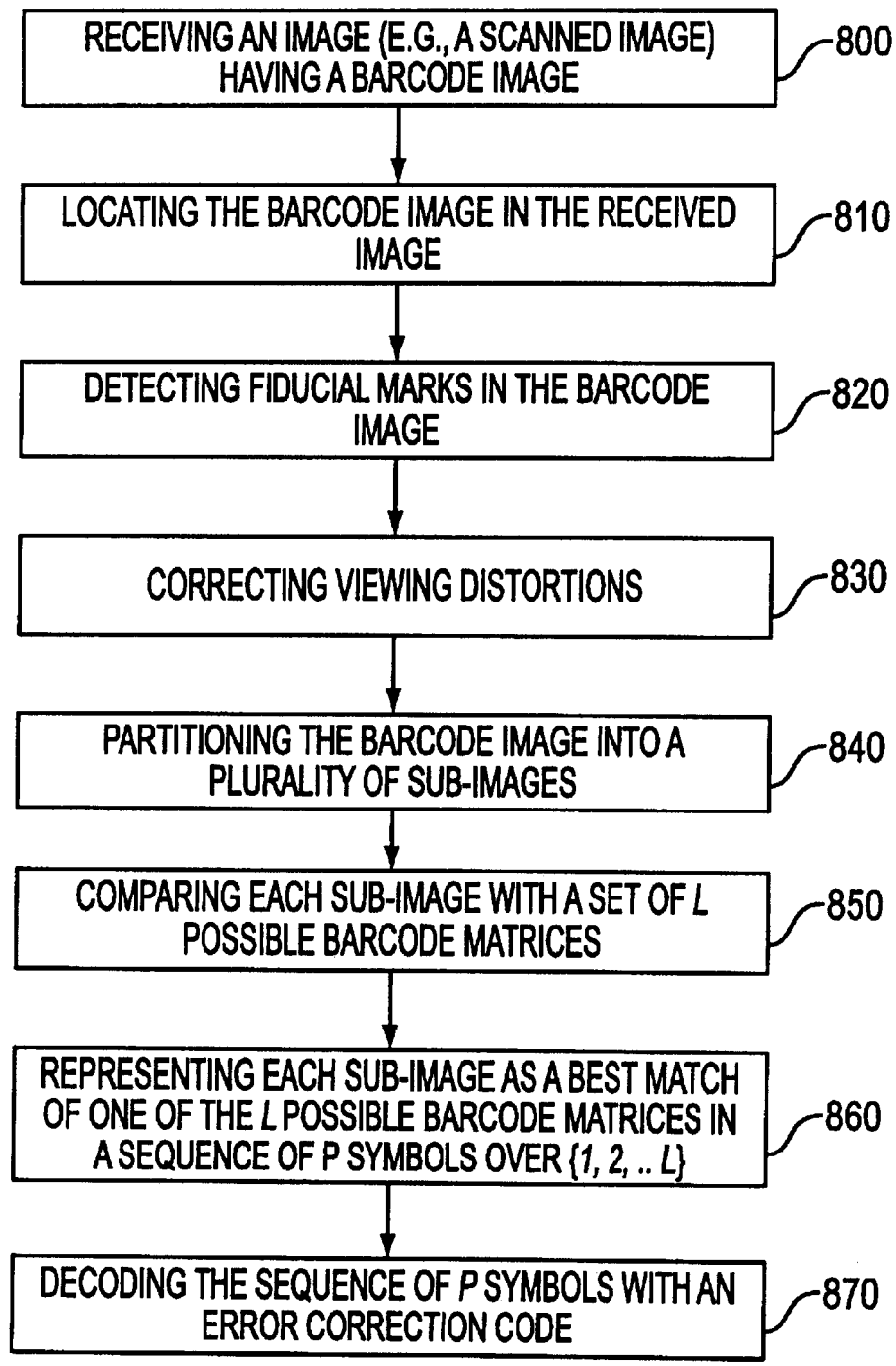
FIG. 8 illustrates a method of decoding a visually significant bar code according to one embodiment of the present invention.

FIG. 8 illustrates a method of decoding a visually significant barcode according to one embodiment of the present invention. In step 800, the acquired image is received, for example, from the scanner. In step 810, the bar code image is located in the received image. For example, the received image can be a whole page of information, whereas the barcode image can be limited to a barcode zone, which may be a portion of the whole page. In one embodiment, the barcodes are located roughly at a same predetermined location in the acquired image and are surrounded by white pixels. This predetermined location is referred to herein as the barcode-zone. Alternatively, the barcodes can be disposed in varying locations on a page, as background, or as a frame for the page. When barcodes are disposed in such a manner, a barcode locating procedure can be utilized to locate the barcode image on the page.

In step 820, the fiducial marks are detected. The configuration of these fiducial marks indicates the type of global deformation introduced by the channel. In one embodiment, the fiducial marks are detected by using a zigzag scan.

Figure 10:
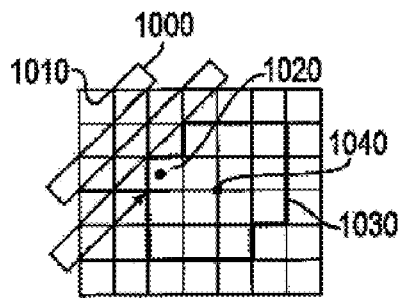
FIG. 10 illustrates a zigzag scan that can be used in the decoding method of FIG. 6 to locate the barcode zone.

FIG. 10 illustrates a zigzag scan 1000 that can be used in step 820 to detect the fiducial marks. The zigzag scan 1000 begins at the upper-left corner 1010. The first dark pixel 1020 of each scan (requires a threshold) is detected and considered to be a part of the corresponding fiducial pixel. The first dark pixel 1020 is also used as an anchor pixel for that mark (red dot in FIG. 5). Next, a flood-fill algorithm, which is known in the art, locates all the dark pixels 1030 connected to these anchors. The centers 1040 of the fiducial marks are then computed as the average (center of mass) of the pixels of each mark. An advantage of this zigzag scan is that it enables a robust detection of the anchor points even in the presence of significant rotations. This scan can be repeated at each corner of the barcode.

In step 830, viewing transformation distortions (e.g., translation, rotation, and affine) are corrected. By setting the center of the coordinate system to be ten pixels above and ten pixels to the left of the center of the upper-left fiducial mark, translation problems can be eliminated. The relative rotation of the center of the upper-right fiducial mark is then determined, and the image is rotated back accordingly.

Next, the skew factor, which is the horizontal translation of the centers of lower marks relative to the horizontal translation of the centers of the upper mark, is determined. If a skew is detected, the image is corrected for the detected skew. These transformation procedures can be implemented with standard procedures known in the computer vision and image processing areas.

In one embodiment, bilinear interpolation is utilized although other interpolators can be used. It is noted that a single affine transformation can be utilized to correct for both the rotation and the skew.

The four fiducial marks enable correction of global transformations with up to eight degrees of freedom. In this embodiment, there are four degrees of freedom (two-translation, one-rotation, and one—skew).

In step 840, the acquired barcode image is partitioned into a plurality of sub-images that can be arranged in a rectangular array, where each sub-image corresponds to a single barcode matrix. Step 830 provides a rectangular image. In one embodiment, the step of partitioning the acquired barcode image involves the steps of measuring the image and slicing the image into rectangular sub-images. In our case M/K=20, and N/K=40 so each rectangular sub-image had the dimensions of 20×40.

In step 850, each sub-image is compared against the set of L possible barcode-matrices (i.e., the outputs of the L distinct maps (e.g., halftoning algorithms) given the corresponding image). When the halftone patterns of FIG. 7B are used, and the logo design is required to have a constant brightness in every logo-matrix, four vector products can be applied to every sub-image. The four vectors are Gaussian profiles that are each centered at the center of a quadrant of the sub-image. For dark sub-images, the pattern of FIG. 7B corresponds to the quadrant having the maximal value, and for bright sub-images, the pattern corresponds to the quadrant having the minimal value. This approach is also known as the matched filter approach in the image processing arts.

In step 860, a best match is selected to represent the sub-image in a sequence of P symbols over $\{1,2,\ldots L\}$. It is noted that any maximum-likelihood-type of detector or any other match estimator can be utilized to determine which of the L possible maps (e.g., halftones) is the most likely to have produced the corresponding sub-image. Preferably, the best match is performed on a group of sub-images.

In step 870, the (possibly erroneous) sequence that was originally coded with an error-correcting code is decoded, thereby eliminating the effect of possible errors due to the degradations of the channel. The corresponding standard BCH error correction may be performed followed by the appropriate re-ordering of the bits.

In step 880, the sequence is decompressed to give the original message.

The present invention provides a barcode pattern with visual significance, thereby increasing its acceptance and use in the business environment and even the home environment. Whereas the prior art bar codes were limited to impersonal commercial and industrial applications, the barcode pattern of the present invention with visual significance changes the sentimental value attached the use of barcodes in more personal contexts from unfavorable to favorable.

In addition, different applications can easily incorporate the visually significant barcode pattern of the present invention and different variations thereof (e.g., different logos or other graphics), thereby enabling a user to customize or personalize the barcode pattern.

Moreover, the present invention utilizes techniques, such as error correction and the use of fiducial marks, to make the visually significant barcode pattern of the present invention robust to imperfections and noise in the hardcopy-handling channel. For example, the barcode pattern of the present invention is robust to consecutive photocopying by common office copiers (e.g., analog and digital copiers). Also, the barcode pattern of the present invention is resilient to common office document degradations, such as folds, stains, marks, and staples.

Furthermore, the visually significant barcode pattern of the present invention can be printed by and read by standard office equipment, such as printers, scanners, copiers, and multi-functional equipment.

The foregoing description has provided numerous examples of the present invention. It will be appreciated that various modifications and changes may be made thereto without departing from the broader scope of the invention as set forth in the appended claims.

What is claimed is:

1. A visually significant barcode system comprising:
   an encoding module configured to receive a message and a base image and to modulate the base image with a graphical encoding of the message to produce a visually significant barcode having the message encoded therein by
      dividing the base image into multiple image areas,
      segmenting image areas to be encoded into multiple groups based on pixel values in the image areas to be encoded, and
      encoding the segmented image areas with sets of two-dimensional code patterns to graphically encode the message in the visually significant barcode, wherein each set of code patterns encodes a respective corresponding group of image areas.

2. The visually significant barcode system of claim 1 further comprising:
   a print engine coupled to the encoding module for receiving the visually significant barcode and based thereon for rendering a hard copy of the visually significant barcode.

3. The visually significant barcode system of claim 2 wherein the
   print engine utilizes a halftone algorithm to render the hard copy of the visually significant barcode.

4. The visually significant barcode system of claim 1 further comprising:
   a decoding module for receiving an acquired version of the visually significant barcode and based thereon for recovering the message encoded therein.

5. The visually significant barcode system of claim 4 further comprising:
   an acquisition engine coupled to the decoding module for receiving a hard copy having a visually significant barcode, and based thereon, for generating the acquired version of the visually significant barcode.

6. The barcode system of claim 4 wherein the decoding module is configured to recover the message encoded in the acquired visually significant barcode by partitioning the acquired visually significant barcode into multiple sub-images, and comparing sub-images against code patterns used to encode the message.

7. The barcode system of claim 4 wherein the encoding module and the decoding module are embodied on a media.

8. The barcode system of claim 7 wherein the media is incorporated in an office machine in the form of a memory.

9. The barcode system of claim 8 wherein the office machine is one of a personal computer, an all-in-one office machine, a printer, and a scanner.

10. The barcode system of claim 7 wherein the media is a computer readable medium.

11. The barcode system of claim 10 wherein the computer readable medium is one of a floppy disk and a compact disc.

12. The barcode system of claim 1 wherein the message is one of an electronic mail address, a uniform resource locator web address, authentication information, a facsimile number, and a file name and location.

13. The barcode system of claim 1 wherein the base image includes a user input feature for allowing a user to provide information.

14. The barcode system of claim 13 wherein the user input feature is one of a circle selection form, check box form, and fill-in form.

15. The barcode system of claim 1 wherein the visually significant barcode is utilized in one of an automatic fax-back application, an automatic email-back application, copy from electronic version application, and a most-recent document application.

16. The barcode system of claim 1 wherein image areas to be encoded are segmented into multiple halftone groups based on gray level values in the images to be encoded, and the segmented image areas are encoded with respective corresponding sets of two-dimensional, coded halftone patterns.

17. The barcode system of claim 1 wherein the base image is an M×N pixel image, each image area and each code pattern is a respective K×K matrix, and the encoding module encodes the segmented image areas by converting the K×K image area matrices to K×K code pattern matrices in accordance with a mapping between the code pattern matrices and the message, wherein M, N, and K are integers.

18. The barcode system of claim 1 wherein the mapping between the code pattern matrices and the message corresponds to an error correction code linking code pattern matrices to symbols of the message.

19. The barcode system of claim 1 wherein the encoding module is configured to convert areas of the base image to fiducial mark areas of the visually significant barcode.

20. The barcode system of claim 19 wherein the encoding module is configured to convert corner areas of the base image to fiducial mark areas of the visually significant bar code.

21. The barcode system of claim 19 wherein each fiducial mark area comprises a region of bright pixels isolating a region of dark pixels from code pattern areas of the visually significant barcode.

22. The barcode system of claim 1 wherein the message received by the encoding module corresponds to a compressed version of an original message.

23. The barcode system of claim 1 wherein each of the base image areas and the code patterns has a same number of pixels.

24. The barcode system of claim 1 wherein each code pattern comprises a pattern of bright and dark pixels.

25. The barcode system of claim 1 wherein each code pattern comprises a multi-tone pattern of dots.

26. The barcode system of claim 25 wherein each code pattern comprises a two-tone pattern of bright dots and dark dots.

27. The barcode system of claim 25 wherein each dot is a square pixel area.

* * * * *